(12) United States Patent
Lee

(10) Patent No.: US 10,797,546 B2
(45) Date of Patent: Oct. 6, 2020

(54) INTERIOR PERMANENT MAGNET ELECTRIC MACHINE WITH FLUX DISTRIBUTING VOIDS

(71) Applicant: BorgWarner Inc., Auburn Hills, MI (US)

(72) Inventor: Seong Taek Lee, Noblesville, IN (US)

(73) Assignee: BorgWarner Inc., Auburn Hills, MI (US)

(*) Notice: Subject to any disclaimer, the term of this patent is extended or adjusted under 35 U.S.C. 154(b) by 26 days.

(21) Appl. No.: 16/242,515

(22) Filed: Jan. 8, 2019

(65) Prior Publication Data

US 2020/0220401 A1 Jul. 9, 2020

(51) Int. Cl.
*H02K 1/16* (2006.01)
*H02K 1/27* (2006.01)

(52) U.S. Cl.
CPC .................. *H02K 1/2766* (2013.01)

(58) Field of Classification Search
CPC ...... H02K 1/2766; H02K 1/276; H02K 1/274; H02K 1/165
See application file for complete search history.

(56) References Cited

U.S. PATENT DOCUMENTS

| | | | |
|---|---|---|---|
| 6,218,753 B1 | 4/2001 | Asano et al. | |
| 6,239,526 B1 | 5/2001 | Oh et al. | |
| 6,940,205 B1 | 9/2005 | Murakami et al. | |
| 7,233,090 B2 | 6/2007 | Evans et al. | |
| 7,557,482 B2 * | 7/2009 | Aydin | H02K 1/2793 310/156.32 |
| 7,843,100 B2 | 11/2010 | Blissenbach et al. | |
| 7,932,658 B2 | 4/2011 | Ionel | |
| 8,102,091 B2 | 1/2012 | Ionel | |
| 8,174,158 B2 | 5/2012 | Rahman et al. | |

(Continued)

FOREIGN PATENT DOCUMENTS

| | | |
|---|---|---|
| JP | 2011-083047 A | 4/2011 |
| JP | 2012-023856 A | 2/2012 |

OTHER PUBLICATIONS

International Search Report and Written Opinion of the International Searching Authority, PCT/US2020/012412, dated May 6, 2020, 10 pages.

*Primary Examiner* — Dang D Le
(74) *Attorney, Agent, or Firm* — Bose McKinney & Evans LLP

(57) ABSTRACT

An electric machine having a rotor with a rotor core formed out of magnetically permeable material and defines a plurality of poles. Each pole includes a plurality of discrete axially extending magnet slots with at least one permanent magnet in each magnet slot. Each pole has a radial centerline and includes a plurality of voids defined by the rotor core. For each pole the magnet slots include at least one central magnet slot and two outer magnet slots, the outer magnet slot are positioned on opposite circumferential sides of the radial centerline of the pole and are at least partially positioned radially outwardly of a radially outermost edge of the at least one central magnet slot. Each of the plurality of voids is spaced from each of the magnet slots and positioned circumferentially between the outer magnet slots and radially outwardly of the at least one central magnet slot.

17 Claims, 11 Drawing Sheets
(9 of 11 Drawing Sheet(s) Filed in Color)

(56) References Cited

U.S. PATENT DOCUMENTS

| | | | |
|---|---|---|---|
| 8,508,094 B2* | 8/2013 | Matt | H02K 1/2773 |
| | | | 310/156.57 |
| 8,664,823 B2 | 3/2014 | Vyas et al. | |
| 8,917,005 B2* | 12/2014 | Rahman | H02K 1/2766 |
| | | | 310/156.53 |
| 9,531,226 B2 | 12/2016 | Arimatsu et al. | |
| 2005/0269888 A1 | 12/2005 | Utaka | |
| 2006/0028082 A1 | 2/2006 | Asagara et al. | |
| 2008/0224558 A1 | 9/2008 | Ionel | |
| 2009/0224624 A1 | 9/2009 | Kumar et al. | |
| 2011/0181230 A1 | 7/2011 | Yamada et al. | |
| 2012/0091848 A1* | 4/2012 | Sakai | H02K 1/2766 |
| | | | 310/156.43 |
| 2013/0113325 A1 | 5/2013 | Saito et al. | |
| 2014/0232231 A1 | 8/2014 | Yabe et al. | |
| 2015/0171682 A1* | 6/2015 | Fujisawa | H02K 1/2766 |
| | | | 310/156.53 |
| 2017/0187257 A1* | 6/2017 | Liu | H02K 1/2766 |
| 2018/0138764 A1* | 5/2018 | Soler | H02K 1/2746 |
| 2018/0145552 A1 | 5/2018 | Hattori | |
| 2018/0241266 A1* | 8/2018 | Azusawa | H02K 1/2766 |
| 2018/0358851 A1 | 12/2018 | Lee | |
| 2019/0089216 A1* | 3/2019 | Sano | H02K 7/006 |
| 2019/0165661 A1* | 5/2019 | Gieras | H02P 25/20 |

* cited by examiner

INTERIOR PERMANENT MAGNET ELECTRIC MACHINE WITH FLUX DISTRIBUTING VOIDS

BACKGROUND

1. Technical Field

The present invention relates to electrical machines and, more particularly, to electrical machines utilizing permanent magnets.

2. Description of the Related Art

Interior permanent magnet electric machines are often employed in hybrid vehicles due in part to their relatively high torque density and efficiency. Such interior permanent magnet electric machines employ a rotor that includes permanent magnets mounted therein to provide the rotor field.

One issue presented by the use of such interior permanent magnet electric machines is a phenomenon referred to as cogging torque. Cogging torque, sometimes referred to as "no current" torque, is a consequence of the position and number of the rotor and stator magnetic poles and their interaction and results in torque ripple and speed ripple.

While known internal permanent magnet electric machines are effective, further improvements remain desirable.

SUMMARY

The present invention provides an interior permanent magnet electric machine with a rotor configuration that enhances the performance of the electric machine.

The invention comprises, in one form thereof, an electric machine that includes a stator operably coupled with a rotor wherein the rotor being rotatable about a rotational axis. The rotor includes a rotor core formed out of magnetically permeable material and defines a plurality of poles. Each pole includes a plurality of discrete axially extending magnet slots formed in the rotor core with at least one permanent magnet being positioned in each of the separate magnet slots with each of the plurality of poles defining a respective radial centerline and including a plurality of voids defined by the rotor core. For each of the plurality of poles: the plurality of magnet slots includes at least one central magnet slot and first and second outer magnet slots, the first and second outer magnet slots being positioned on opposite circumferential sides of the radial centerline of the pole and being at least partially positioned radially outwardly of a radially outermost edge of the at least one central magnet slot. Each of the plurality of voids is spaced from each of the magnet slots and positioned circumferentially between the first and second outer magnet slots and radially outwardly of the at least one central magnet slot.

In some embodiments of the electric machine, the at least one central magnet slot comprises two discrete central magnet slots with each of the central magnet slots having at least one permanent magnet disposed therein.

In some embodiments of the electric machine, each of the plurality of voids has a radial length and a circumferential width wherein the radial length is greater than the circumferential width.

In some embodiments, each of the plurality of voids has a common circumferential width. Alternatively, or additionally, each of the plurality of voids may be spaced from an outer radial perimeter of the rotor core by a radial distance that is at least twice the circumferential width of the void.

In some embodiments, each of the plurality of voids is spaced from an outer radial perimeter of the rotor core by a first radial distance that is greater than a minimum radial distance separating the first and second outer magnet slots from the outer radial perimeter of the rotor core. In such an embodiment, the first radial distance may be no greater than a minimum radial distance separating the permanent magnets disposed in the first and second outer magnet slots from the outer radial perimeter of the rotor core and each of the plurality of voids may also be radially spaced from a radially outer edge of the at least one central slot by a second radial distance that is at least as great as the first radial distance.

In some embodiments, each of the plurality of voids is separated from a circumferentially adjacent void or magnet slot by a circumferential distance that is at least three times greater than the circumferential width of the void, or, by a circumferential distance that is at least six times greater than the circumferential width of the void.

In some embodiments, each of the voids includes opposing, radially extending edges wherein the radially extending edges of each void are linear and parallel. In such an embodiment, the radially extending edges of each void may be parallel with a radial line bisecting the void.

In some embodiments, each of the voids has the same circumferential width. In such embodiments, the voids may be positioned symmetrically about the centerline of the pole and the radial length of the voids may vary with voids having shorter radial lengths being positioned circumferentially outwardly of voids having longer radial lengths. Such embodiments may further be configured to include at least two voids on each circumferential side of the centerline of the pole which have a common radial length wherein at least one void having a radial length shorter than the common radial length is disposed on each circumferential side of the centerline of the pole and positioned circumferentially outwardly of the at least two voids having a common radial length.

The invention comprises, in another form thereof, an electric machine that includes a stator operably coupled with a rotor wherein the rotor is rotatable about a rotational axis. The rotor includes a rotor core formed out of magnetically permeable material and defines a plurality of poles. Each pole includes a plurality of discrete axially extending magnet slots formed in the rotor core with at least one permanent magnet being positioned in each of the separate magnet slots. Each of the plurality of poles also defines a respective radial centerline and includes a plurality of voids defined by the rotor core wherein each of the plurality of poles has a configuration that is symmetrical about the respective radial centerline. For each of the plurality of poles the plurality of magnet slots includes at least one central magnet slot and first and second outer magnet slots, the first and second outer magnet slots being positioned on opposite circumferential sides of the radial centerline of the pole and being at least partially positioned radially outwardly of a radially outermost edge of the at least one central magnet slot. For each of the poles, each of the plurality of voids axially extends through the rotor core and is spaced from each of the magnet slots and positioned circumferentially between the first and second outer magnet slots and radially outwardly of the at least one central magnet slot, each of the plurality of voids having a radial length and a circumferential width wherein the radial length is greater than the circumferential width; and wherein each of the plurality of voids is spaced from an outer radial perimeter of the rotor core by a first radial distance that is at least twice the circumferential width of the void and is spaced from a radially outer edge of the at least one central magnet slot by a second radial distance that is at least as great as the first radial distance; and wherein each of the plurality of voids is separated from a circumferentially adjacent void or magnet slot by a circumferential distance that is at least as great as the circumferential width of the void.

In some embodiments of such an electric machine, each of the plurality of voids has a common circumferential width.

Such embodiments may be further configured such that the first radial distance is greater than a minimum radial distance separating the first and second outer magnet slots from the outer radial perimeter of the rotor core and the first radial distance is no greater than a minimum radial distance separating the permanent magnets disposed in the first and second outer magnet slots from the outer radial perimeter of the rotor core.

Such embodiments may be still further configured such that each of the plurality of voids is separated from a circumferentially adjacent void or magnet slot by a circumferential distance that is at least three times greater than the circumferential width of the void.

Such embodiments may still further be configured such that the radial length of the voids varies with voids having shorter radial lengths being positioned circumferentially outwardly of voids having longer radial lengths.

Such embodiments may yet further be configured such that at least two voids on each circumferential side of the centerline of the pole have a common radial length and at least one void having a radial length shorter than the common radial length is disposed on each circumferential side of the centerline of the pole and positioned circumferentially outwardly of the at least two voids having a common radial length.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above mentioned and other features of this invention, and the manner of attaining them, will become more apparent and the invention itself will be better understood by reference to the following description of an embodiment of the invention taken in conjunction with the accompanying drawings, wherein.

Figure 1:
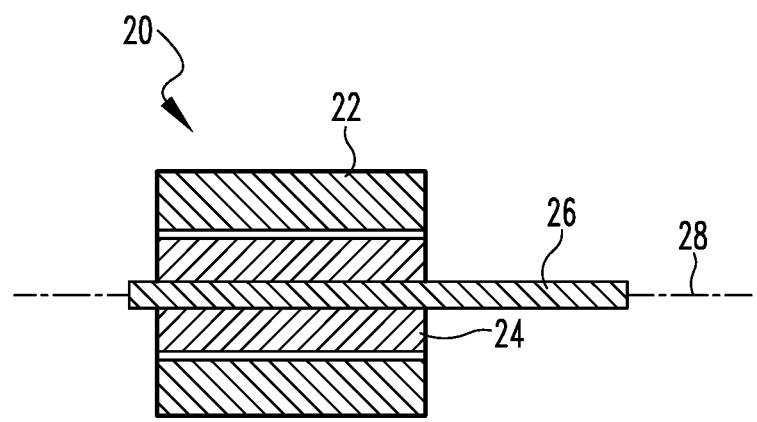
FIG. 1 is a schematic cross-sectional view of an electric machine.
Figure 2:
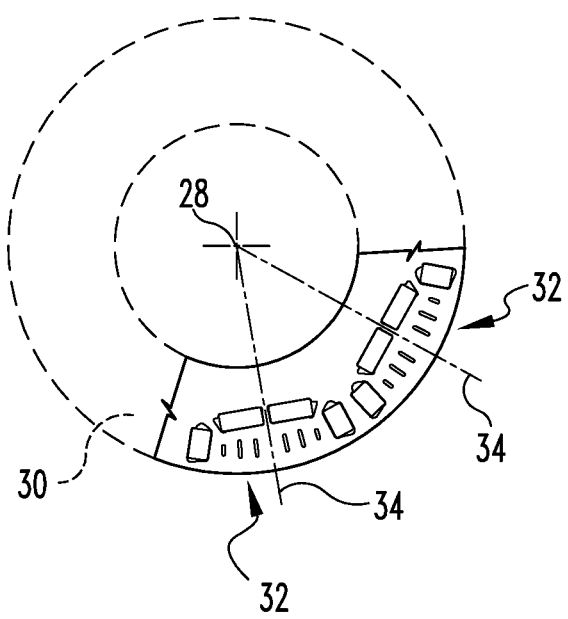
FIG. 2 is a partial end view of a rotor.
Figure 3:
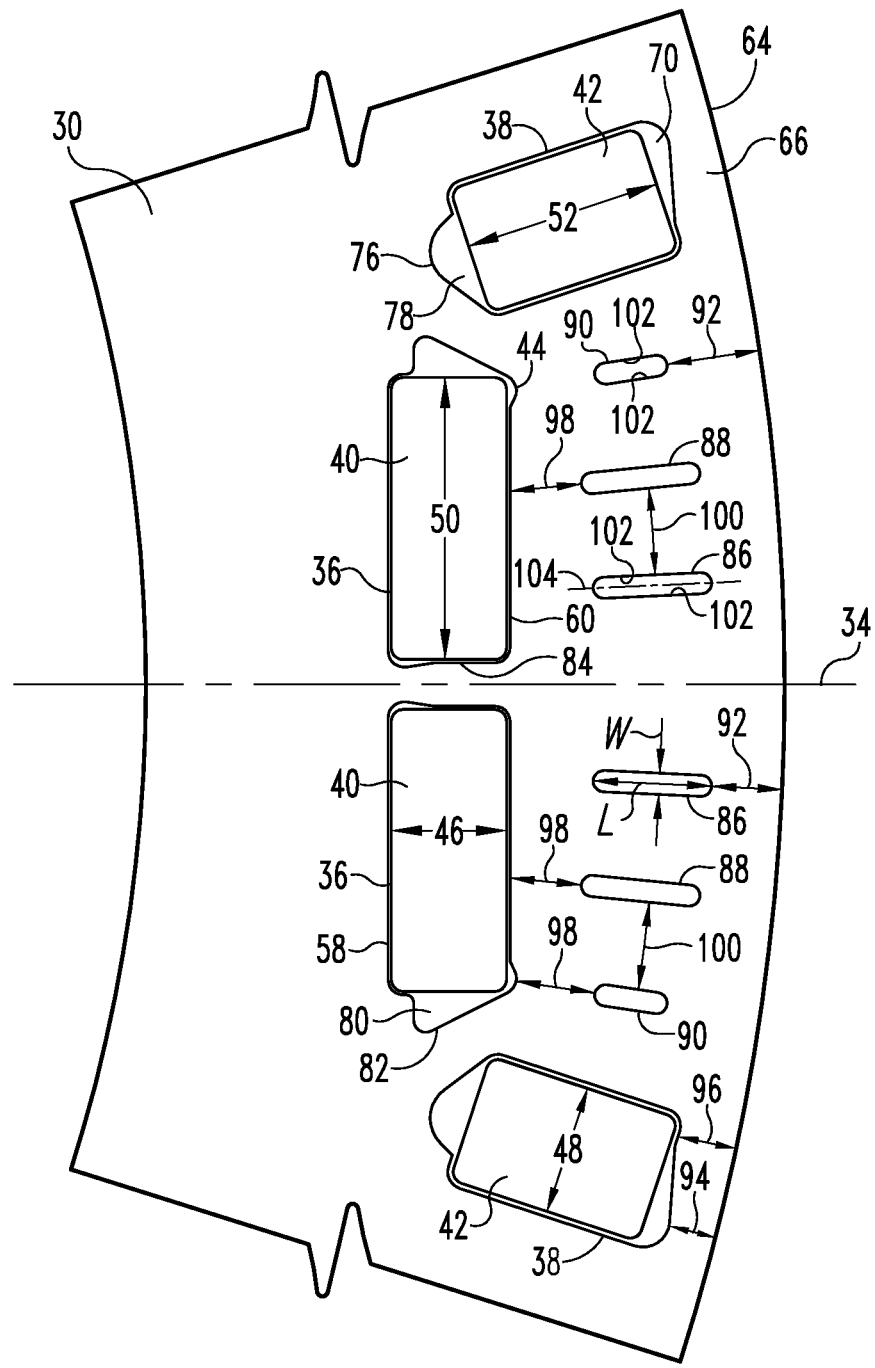
FIG. 3 is a partial end view of a rotor showing a single pole.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

FIG. 1 provides a schematic cross-sectional view of an electric machine 20. Electric machine 20 includes a stator 22 having a stator core and a plurality of windings. A rotor 24 is operably coupled with stator 22 and has a shaft 26 secured thereto. Rotor 24 and shaft 26 rotate relative to stator 22 about rotational axis 28. Electric machine 20 is an interior permanent magnet synchronous machine (IPMSM) and may be employed as a motor/generator in a hybrid vehicle wherein it selectively operates as either a motor or a generator.

Rotor 24 includes a rotor core 30 and defines a plurality of magnetic poles 32 which interact with stator 22 during operation of electric machine 20. The illustrated electric machine 20 is an internal permanent magnet electric machine and each of the poles 32 of rotor 24 include a plurality of axially extending magnet slots formed in rotor core 30 with at least one permanent magnet positioned in each of the magnet slots. The magnets may be secured within the slots using an interference fit, using an adhesive material, another securement method or combination of securement methods.

Rotor core 30 is formed out of magnetically permeable material. For example, rotor core 30 may be formed out of a plurality of stacked laminations wherein each individual lamination is a sheet of electrical steel. The use of stacked electrical steel laminations to form a rotor core is well known to those having ordinary skill in the art. Electrical steel often has a relative magnetic permeability of around 4,000. By definition, a vacuum has a relative magnetic permeability of 1.

As discussed in greater detail below, the magnet slots formed in rotor core 30 define gaps and voids at selected locations in each pole 32. These gaps and voids have a relative magnetic permeability less than that of the rotor core 30. For example, these gaps may be filled with air. Air has a relative magnetic permeability of 1.00000037. Which, for purposes of this disclosure can be rounded to the nearest whole number, i.e., 1. Instead of leaving the gaps and voids as air-filled space, it is also possible to fill these gaps and voids with a polymeric and/or adhesive material which may be used to further secure the magnets within the slots or simply fill the open space. Advantageously, the material used to fill the gaps/voids has a relative magnetic permeability of 1.

Each of the rotor poles 32 define a radial centerline 34 that intersects rotational axis 28. In the illustrated embodiment, poles 32 are symmetric about centerline 34, however, alternative embodiments could include some asymmetric features. In this regard, it is noted that the illustrated electric machine is operable in both rotational directions, however, alternative embodiments could be used for applications where the electric machine operates in only one rotational direction. The illustrated embodiment includes ten rotor poles 32, however, alternative embodiments may employ a different number of poles.

The individual poles 32 include a plurality of discrete magnet slots that includes at least one central magnet slot 36 and two outer magnet slots 38. As used herein a discrete magnet slot is a slot that is separated by the magnetically permeable material forming the rotor core from the other magnet slots. In the illustrated embodiment, each of the poles 32 have the same configuration and include two central magnet slots 36 with one of the central magnet slots 36 being disposed on each side of the radial centerline 34. Outer magnet slots 38 are positioned on opposite circumferential sides of radial centerline 34 and, advantageously, at least partially circumferentially outwardly of a radially outermost edge 44 of the central magnet slots 36. In the illustrated embodiment, the permanent magnets 42 within outer magnet slots 38 are positioned entirely circumferentially outwardly of the permanent magnets 40 disposed within central magnet slots 36.

Each of the slots 36, 38 has at least one permanent magnet 40, 42 disposed therein. In the illustrated embodiment, each slot 36, 38 has only a single magnet 40, 42 disposed therein, however, alternative embodiments could position more than one magnet in one or more of the magnet slots.

As can be seen in the figures, magnets 42 disposed in the outer magnet slots 38 are smaller than the magnets 40 disposed in the central magnet slots 36. All of the magnets 42 disposed in the outer magnet slots 38 have the same dimensions and all of the magnets 40 disposed in the central magnet slots 36 have the same dimensions.

In the illustrated embodiment, permanent magnets 40, 42 are all parallelepipeds with each face of the permanent magnets 40, 42 being rectangular. In this regard, it is noted that the faces are not perfectly rectangular but have slightly rounded corners and edges.

All of the magnets 40, 42 have the same axial length. Magnets 40 disposed in central magnet slots 36 have a greater length 50 and smaller width 46 than the length 52 and width 48 of magnets 42 disposed in outer magnet slots 38.

The use of a rectangular cross section and common axial length provides for manufacturing efficiency. The axial length of the magnets corresponds to the axial length of the rotor core 30. The illustrated magnets are all formed out of the same material. Any suitable permanent magnetic material may be used. For example, magnets 40, 42 may take the form of rare earth magnets or ferrite magnets.

It is additionally noted that while the illustrated embodiment has a single magnet disposed in each slot and uses two differently sized magnets, under some circumstances it may prove more efficient to utilize multiple magnets in some or all of the magnet slots. For example, it might be possible to use only one sized magnet and employ three of the magnets in the central slots and two of the magnets in the outer slots if electric machine 20 were designed with all of the magnets having a common width.

Magnet slots 36, 38 of each pole 32 are positioned to define a U-shaped configuration with magnets 40 positioned in central slots 36 oriented such that they extend a greater circumferential distance than radial distance. In this regard, it is noted that magnets 40 are positioned such that length 50 is substantially equivalent to the circumferential distance over which magnets 40 extend and width 46 is substantially equivalent to the radial distance over which magnets 40 extend. Magnets 42 positioned in outer magnet slots 38 are oriented such that they extend a greater radial distance, which generally corresponds to length 52, than circumferential distance, which generally corresponds to width 48.

In the illustrated embodiments, central magnet slots 36 are linearly aligned with the radially inner edges 58 of both slots being colinear and the radially outer edges 60 also being colinear. Outer magnet slots 38 are separated by a circumferential distance that becomes greater as the outer magnet slots 38 approach the outer radial perimeter 64 of rotor core 30. In other words, outer magnet slots 38 angle outwardly as they progress radially outwardly.

Outer magnet slots 38 each define a material bridge 66 that is disposed between the outer magnet slot 38 and the radially outer perimeter 64 of rotor core 30. Material bridges 66 are tapered bridges that define a radial thickness that varies. As can be seen in the figures, material bridges 66 have a radial thickness that decreases as the circumferential distance from the radial centerline 34 increases. The use of such a tapered material bridge 66 has certain advantages that are discussed in greater detail in U.S. patent application Ser. No. 16/242,340 filed Jan. 8, 2019 and entitled INTERIOR PERMANENT MAGNET ELECTRIC MACHINE WITH TAPERED BRIDGE STRUCTURE which is hereby incorporated herein by reference.

In each outer magnet slot 38, a gap 70 is defined between permanent magnet 42 and material bridge 66. Each of the poles 32 is configured to define two additional gaps in the magnet slots. At the radially inner edge 76 of outer magnet slots 38, magnet 42 is positioned to define a gap 78 between magnet 42 and radially inner edge 76. In the central magnet slots 36, a gap 80 is formed between the permanent magnet 40 and the outer circumferential edge 82 of the central magnet slot 36. Permanent magnet 40 is positioned directly adjacent the inner circumferential edge 84 of the central magnet slot 36 whereby no gap is formed at this edge. In this regard, it is noted that a thin layer of adhesive or other material may be present between magnet 40 and inner circumferential edge 84. Additionally, or alternatively, small voids due to manufacturing tolerances may be present between magnet 40 and inner circumferential edge 84 without thereby defining a gap within central magnet slot 36 which would materially impact the electromagnetic flux at this location during operation in the manner of gaps 70, 78, 80. As mentioned above, gaps 70, 78, 80 may be air-filled spaces or may be filled with a polymeric and/or adhesive material which may be used to secure the magnets within the slots. If the gaps are filled with a solid material, it will generally be desirable to use a material having a relative magnetic permeability of 1.

Each of the poles 32 also includes a plurality of voids 86, 88, 90 that are spaced from each of the magnet slots 36, 38 and from each other with the magnetically permeable material forming the rotor core 30 separating each of the individual voids 86, 88, 90 from each other and the magnet slots 36, 38. The voids 86, 88, 90 are positioned circumferentially between the two outer magnet slots 38 and radially outwardly of the central magnet slots 36.

The voids may be filled with air, or, as discussed above filled with a solid material such as a polymeric material that has a magnetic permeability significantly less than that of the material used to form the rotor core, for example, a material having a relative magnetic permeability of around 1. In embodiments having voids filled with a solid material, they are still considered voids as that term is used herein because they are void of material having a magnetic permeability comparable to that of the material used to form the rotor core 30.

In the illustrated embodiment, each pole 32 includes six voids, with three voids located on each side of centerline 34. In the illustrated embodiment, not only are the voids symmetrically disposed about centerline 34 but the entire configuration of pole 32 is symmetric about centerline 34. In this embodiment, the circumferentially innermost voids 86 and the middle voids 88 have the same dimension and the circumferentially outer void 90 has a shorter radial length.

Each of the illustrated voids has a radial length L that is larger than its circumferential width W. For the illustrated voids, all of the voids have the same circumferential width, i.e., a common circumferential width. Each of the voids is spaced from outer radial perimeter 64 of rotor core 30 by a radial distance 92 that is at least twice the circumferential width W of the void.

These radial distances 92 are all greater than a minimum radial distance 94 separating the outer magnet slots 38 from outer radial perimeter 64 of rotor core 30 and are no greater than a minimum radial distance 96 separating the permanent magnets 42 disposed in slots 38 from the outer radial perimeter 64.

Each of the voids 86, 88, 90 is also spaced from the radially outer edge 60 of central slots 36 by a radial distance 98 that is at least as great as that void's radial distance 92 to the outer radial perimeter 64.

Each of the voids are also separated from a circumferentially adjacent void or magnet slot 38 by a circumferential distance 100 that is at least as great as the circumferential width W of the void. Advantageously, this circumferential distance is at least three times greater than the circumferential width W of the immediately adjacent voids, or, as depicted in the illustrated embodiment, at least six times greater than the circumferential width W of any immediately adjacent void. In this regard, it is noted the illustrated configuration of voids 86, 88, 90 leaves a substantial quantity of magnetically permeable rotor core material surrounding the voids. As discussed below, the voids are sufficient to provide substantial benefits but their relatively small size allows the rotor core to retain significant mechanical strength and structural integrity which can be a factor in electrical machines having a high power density and high rotational speeds.

Each of the individual voids has a similar shape although not necessarily the same dimensions. More specifically, in the illustrated embodiment, the voids all have opposing radially extending edges 102 that are linear, i.e., formed by a straight line, and are parallel with each other. Edges 102 of each void are also parallel with a radial line 104 that bisects the void.

As mentioned above, voids 86, 88, 90 are symmetrically positioned about centerline 34 with the individual voids having varying lengths. More specifically, voids 86, 88 all have the same radial length L while voids 90 have a shorter radial length L. The voids are positioned such that the voids having a shorter radial length are positioned circumferentially outwardly of voids having a longer radial length. In the illustrated embodiment, three voids are positioned on each side of centerline 34 with voids 86, 88 having the same radial length and a void 90 positioned on each side of centerline 34 with voids 90 being positioned circumferentially outwardly of voids 86, 88.

Figure 4:
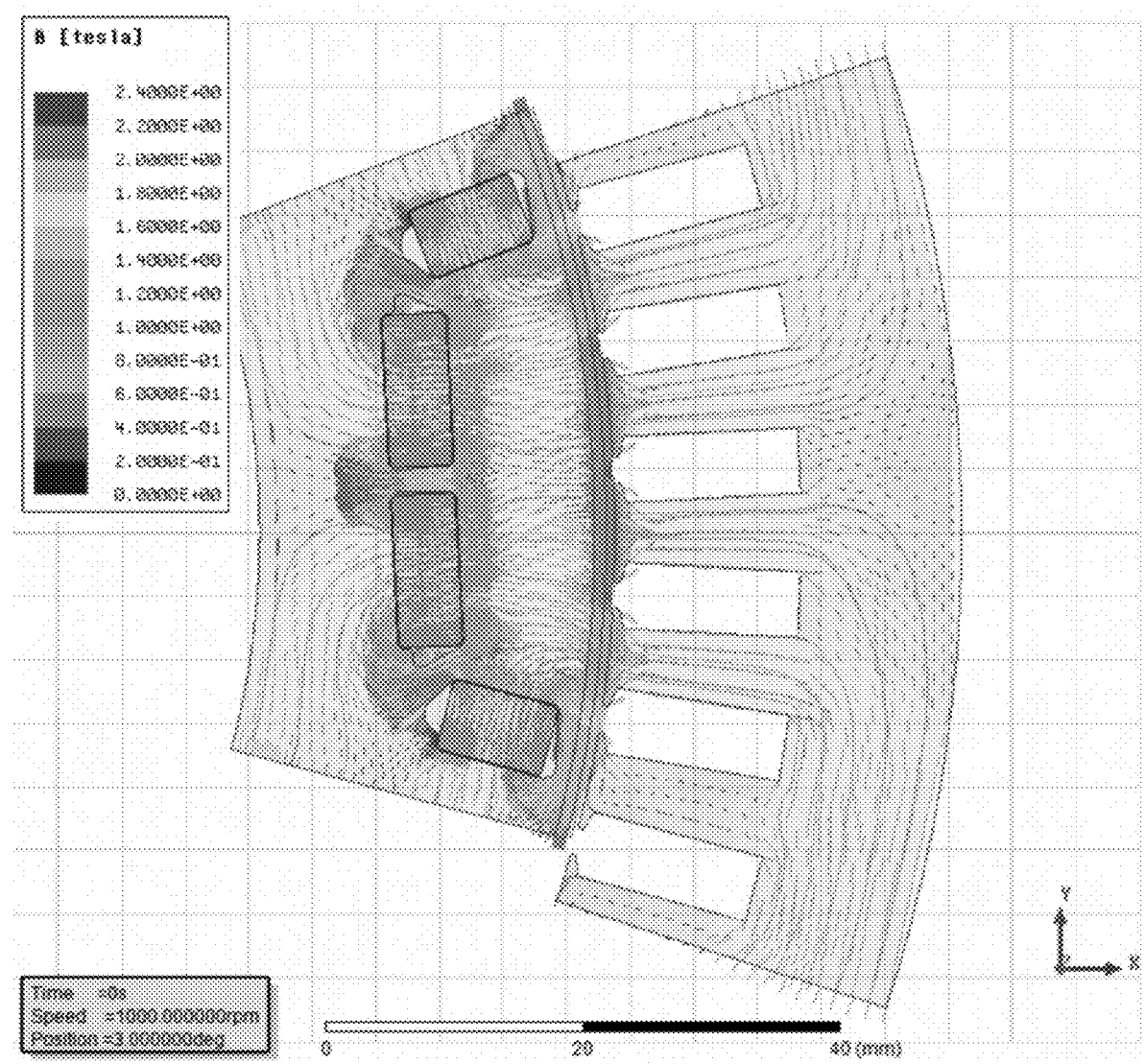
FIG. 4 is a partial end view of a rotor without voids depicting flux density at no load.
Figure 5:
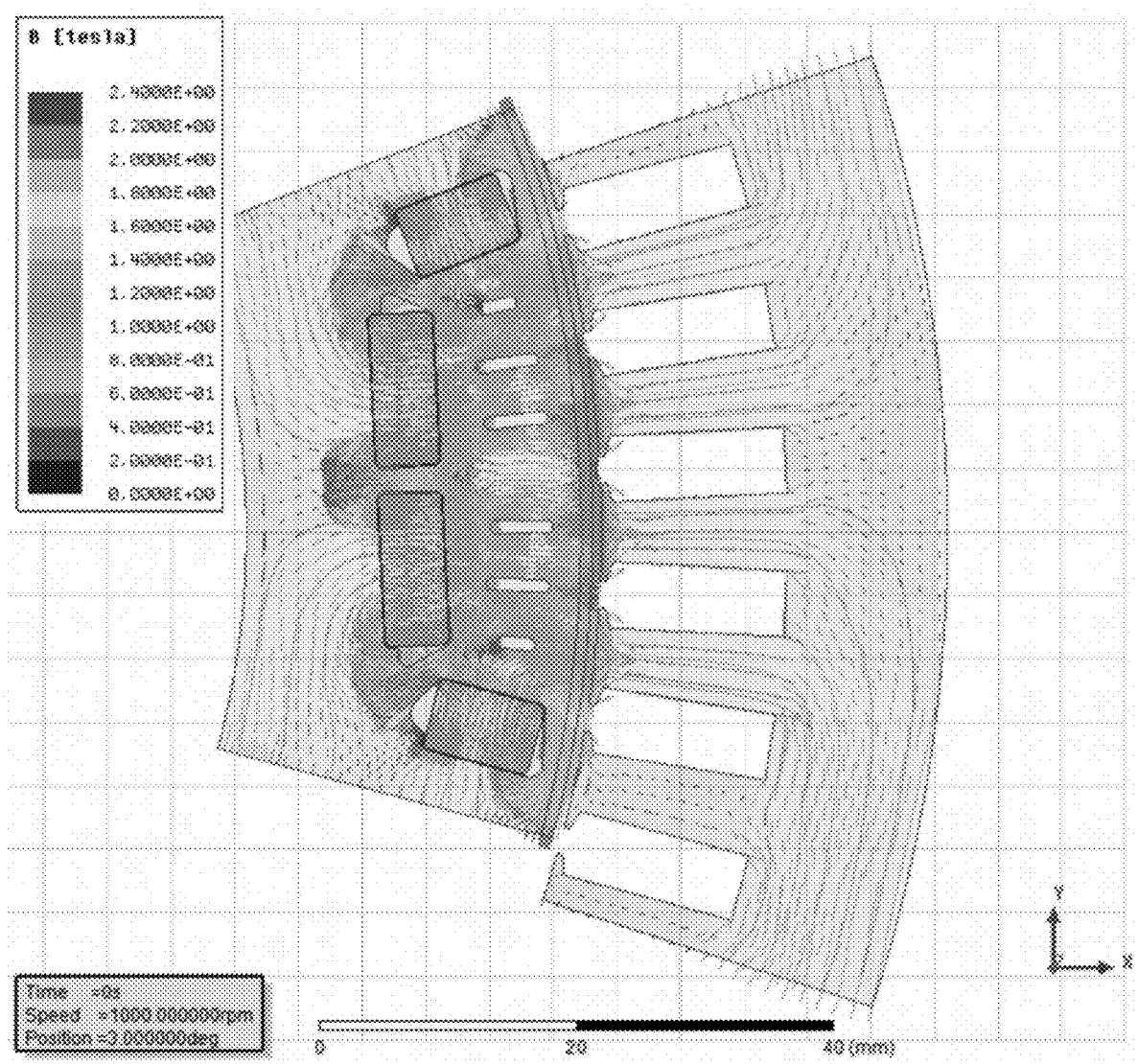
FIG. 5 is a partial end view of the rotor of FIGS. 1-3 depicting flux density at no load.

A computer model was used to compare an electric machine having voids 86, 88, 90 with an electric machine that is identical except for not having voids 86, 88, 90. FIG. 4 shows the calculated flux density of a rotor pole of an electric machine that does not include voids 86, 88, 90 while FIG. 5 shows the calculated flux density for an electric machine with voids 86, 88, 90. In FIGS. 4 and 5 the electric machines are operated as a motor under no load and the rotor is rotating at 1000 rpm in a direction counterclockwise as viewed in FIGS. 4 and 5. The calculated strength of the magnetic field B (measured in tesla) within the electric machine is represented by different colors in FIGS. 4 and 5. As shown in the legend, the different colors represent values between 2.4 tesla down to zero tesla in 2.0×10-1 tesla increments.

As can be seen from a comparison of FIGS. 4 and 5, there is very little difference in the magnetic field B that is generated at the air gap between the rotor and the stator by these two different electric machines when they are operated under no load.

Figure 6:
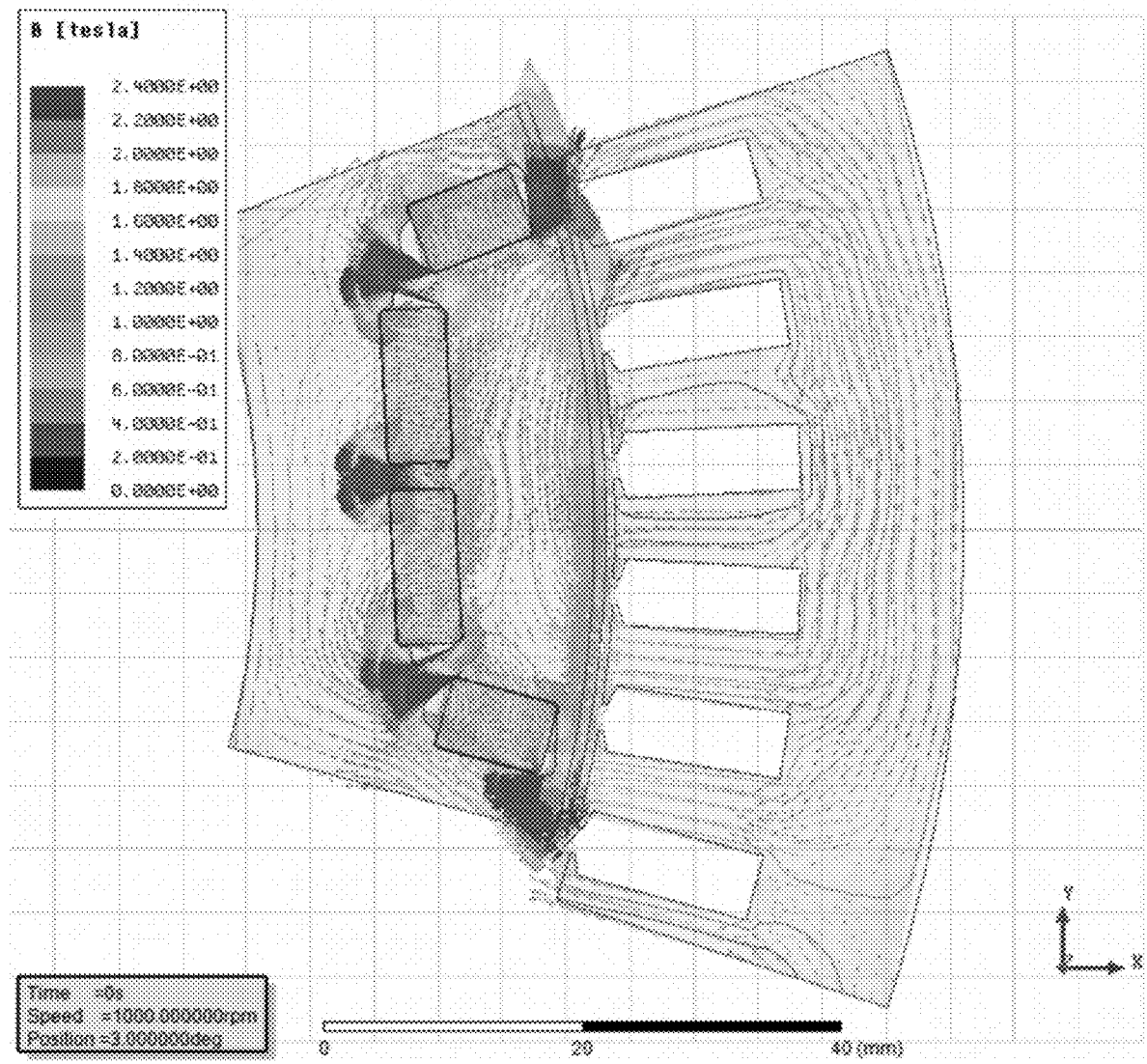
FIG. 6 is a partial end view of a rotor without voids depicting flux density at full load.
Figure 7:
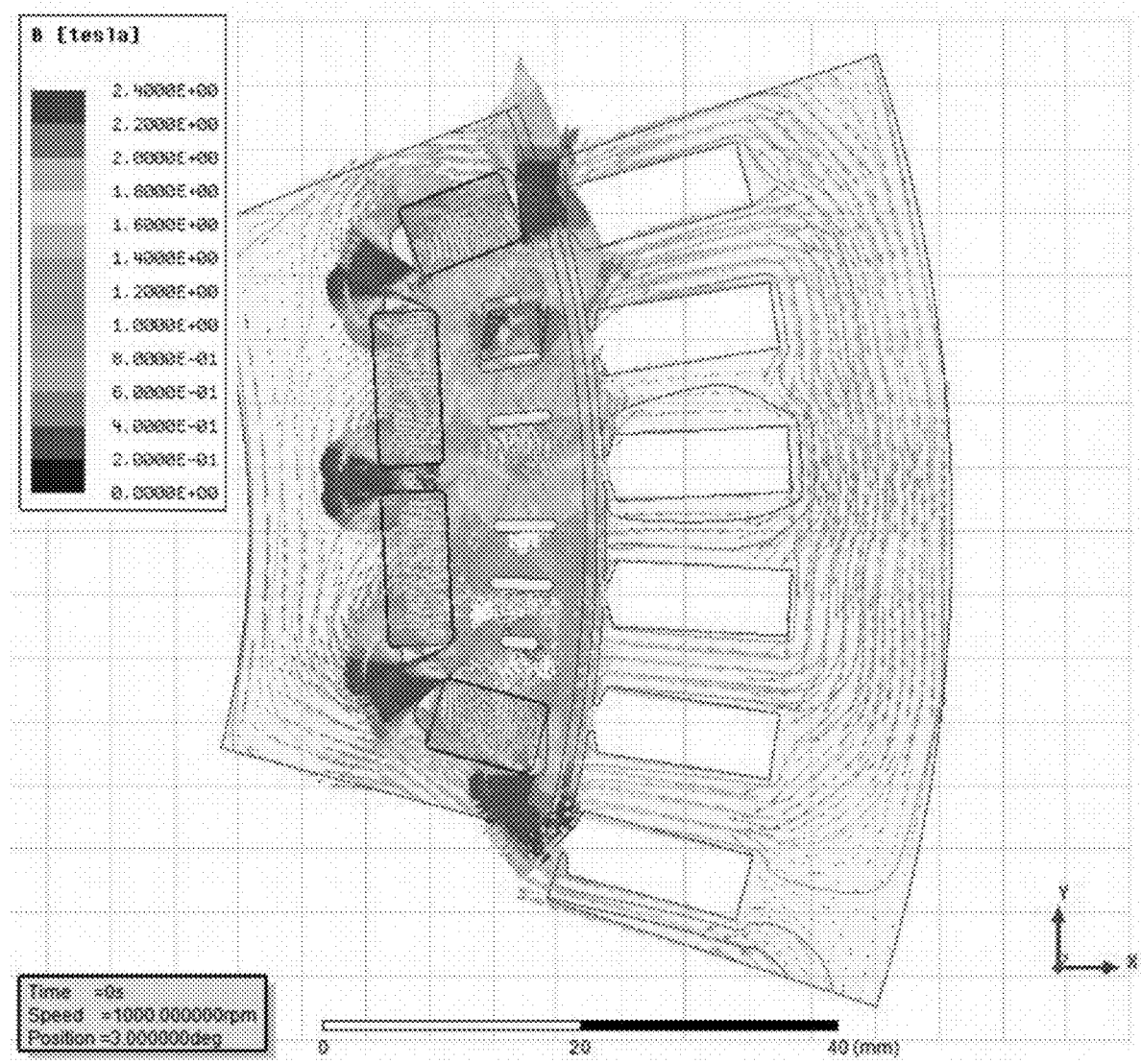
FIG. 7 is a partial end view of the rotor of FIGS. 1-3 depicting flux density at full load.

Similarly, FIG. 6 shows the calculated flux density of a rotor pole of an electric machine that does not include voids 86, 88, 90 while FIG. 7 shows the calculated flux density for an electric machine with voids 86, 88, 90 under different operating conditions. In FIGS. 6 and 7 the electric machines are operated as a motor under full load and the rotor is rotating at 1000 rpm in a direction counterclockwise as viewed in FIGS. 6 and 7. The calculated strength of the magnetic field B (measured in tesla) within the electric machine is represented by different colors in FIGS. 6 and 7. As shown in the legend, the different colors represent values between 2.4 tesla down to zero tesla in 2.0×10-1 tesla increments.

As can be seen from a comparison of FIGS. 6 and 7, the electric machine having voids 86, 88, 90 has a stronger magnetic field B in the air gap between the rotor and stator when these two different electric machines are operated as a motor under full load. This greater distribution of the flux density reduces undesirable torque ripple.

FIGS. 8-12 provide charts comparing the calculated torque ripple of the electric machine of FIGS. 4 and 6 (without voids) with the electric machine of FIGS. 5 and 7 (with voids) when operating as a motor and over a range of electrical loads.

Figure 8:
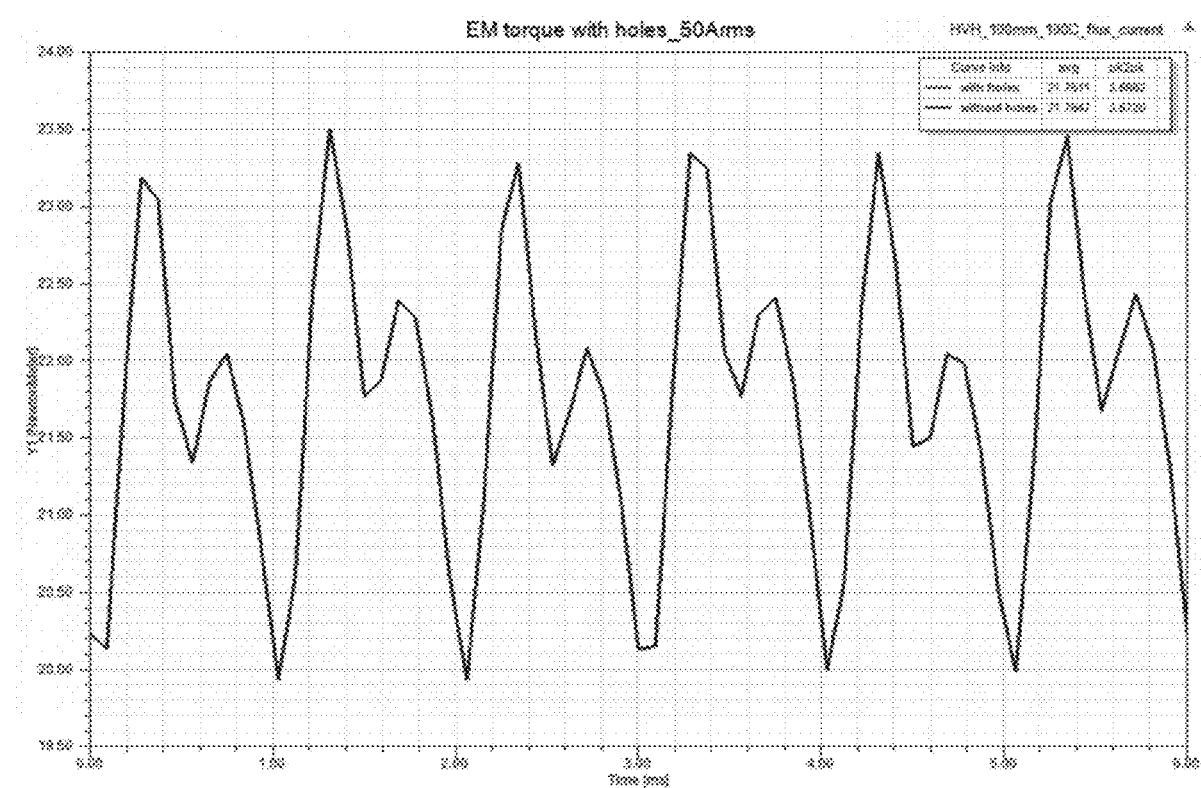
FIG. 8 is a chart comparing the torque ripple generated by a rotor without voids and the rotor of FIGS. 1-3 at 50 Arms armature current.

In FIG. 8, the chart compares the calculated torque values of the electric machines when the stator windings have a current draw of 50 $A_{rms}$. $A_{rms}$ is the root mean square of the Amps being drawn by the electric machine. Under real world conditions, the current draw may vary slightly and the use of the $A_{rms}$ draw current provides a meaningful average value. The torque ripple can be calculated from this data and, at this relatively light load, the torque ripple of the electrical machine without voids (blue line) is nearly identical to the torque ripple of the electrical machine with voids (red line) with the two lines essentially overlapping and the calculated torque ripple for the machine without voids being 16.42% and the calculated torque ripple for the machine with voids being 16.40%.

Figure 9:
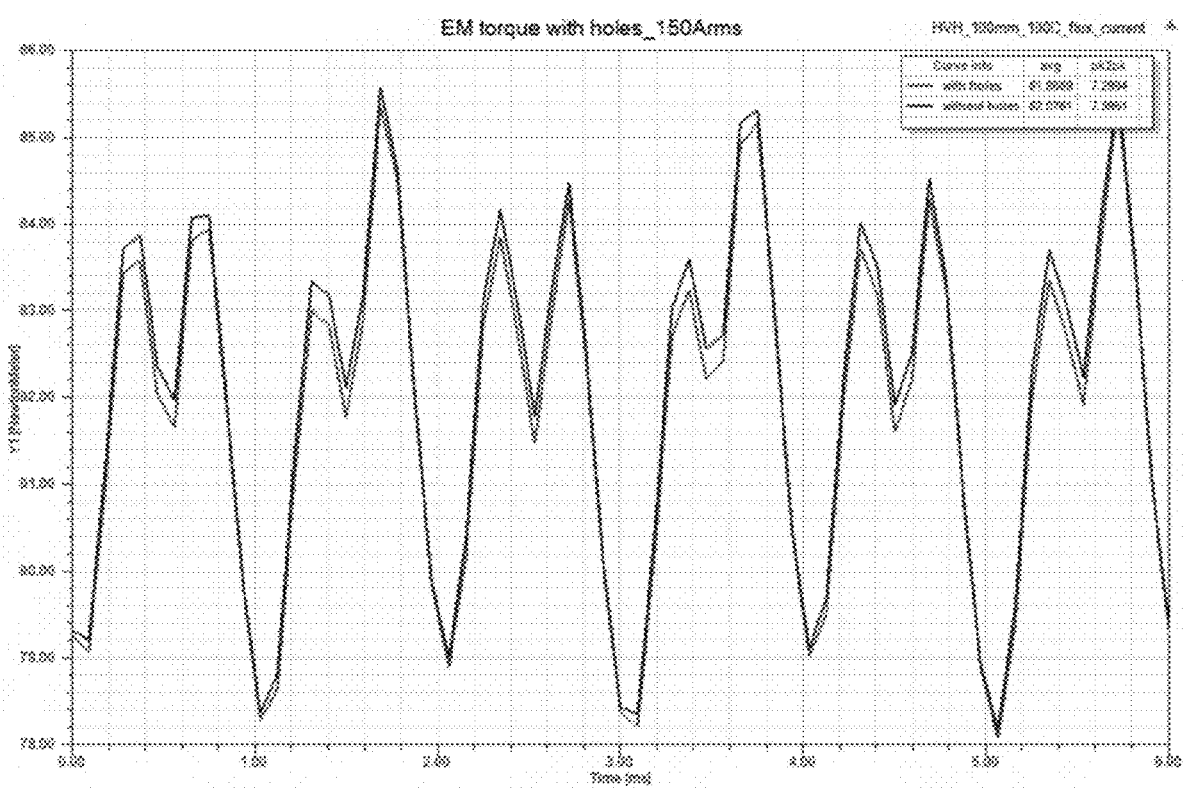
FIG. 9 is a chart comparing the torque ripple generated by a rotor without voids and the rotor of FIGS. 1-3 at 150 Arms armature current.

FIG. 9 provides a similar comparison at 150 $A_{rms}$, at this load, the calculated torque ripple for the machine without voids (blue line) is 9.01% and the calculated torque ripple for the machine with voids (red line) is 8.92%.

Figure 10:
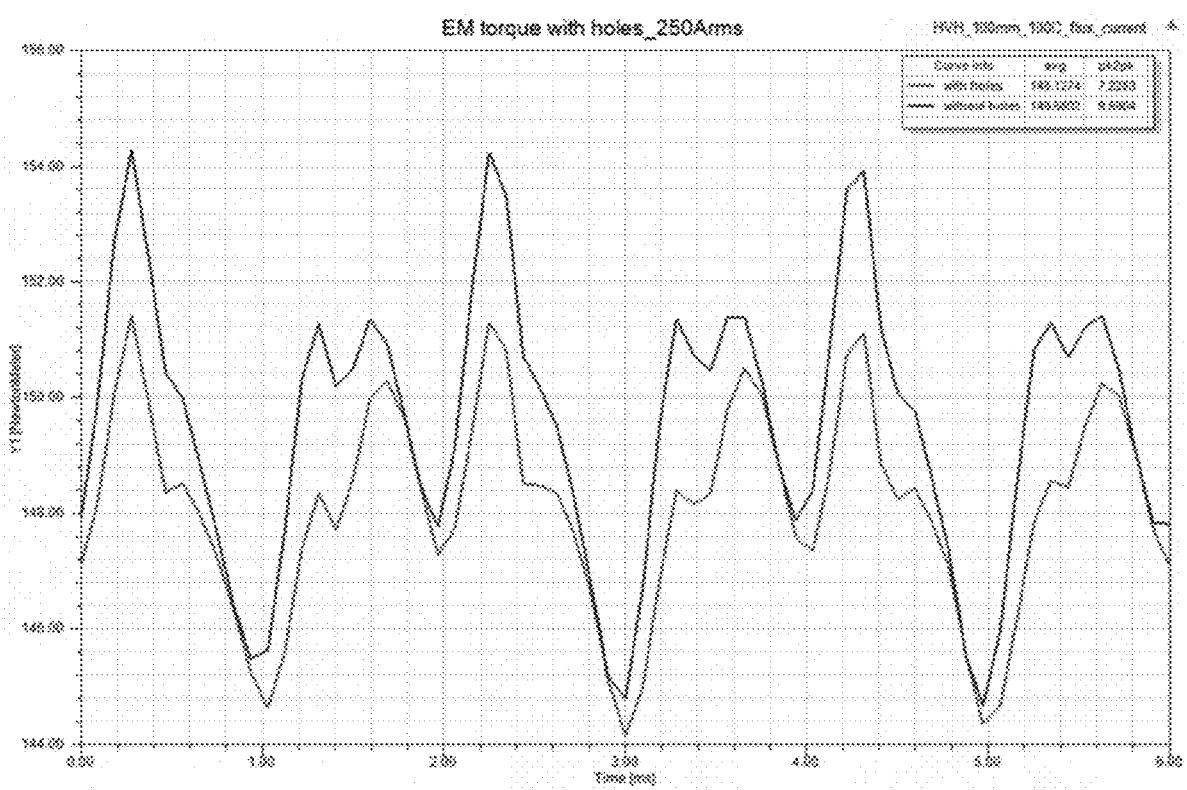
FIG. 10 is a is a chart comparing the torque ripple generated by a rotor without voids and the rotor of FIGS. 1-3 at 250 Arms armature current.

FIG. 10 provides a similar comparison at 250 $A_{rms}$, at this load, the calculated torque ripple for the machine without voids (blue line) is 6.41% and the calculated torque ripple for the machine with voids (red line) is 4.88%.

Figure 11:
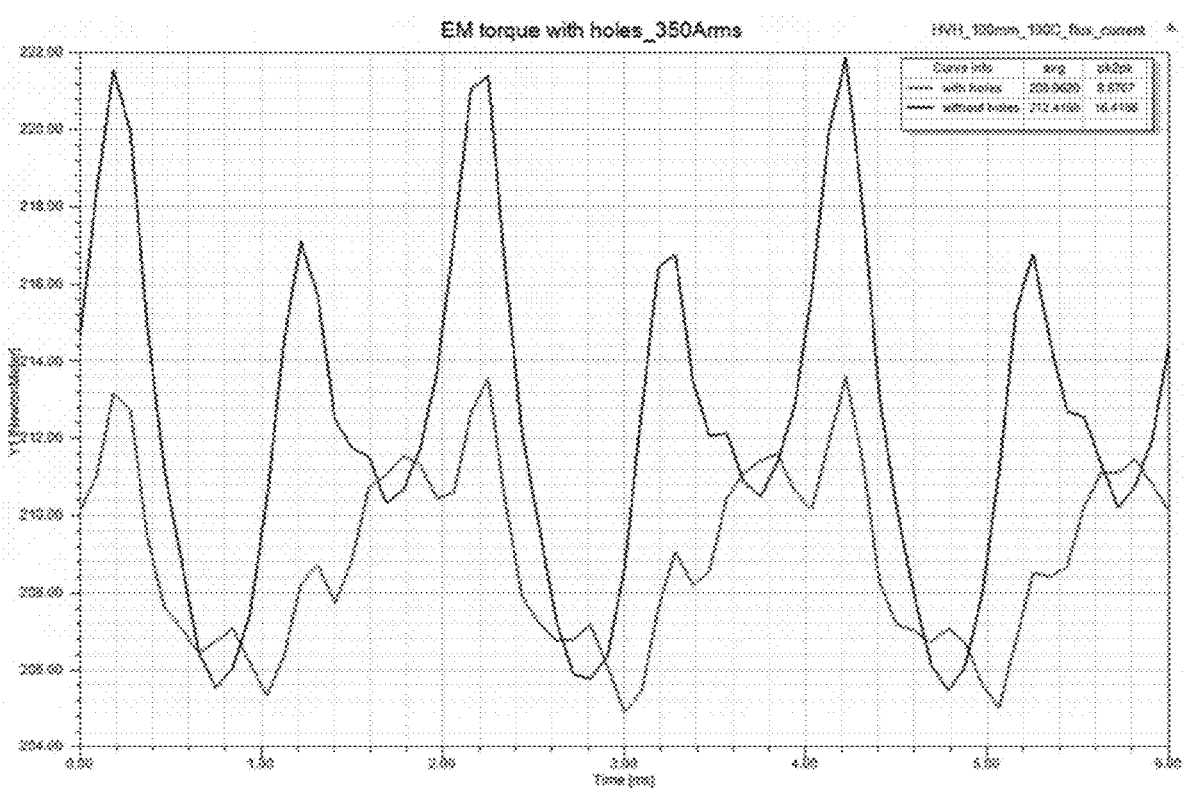
FIG. 11 is a chart comparing the torque ripple generated by a rotor without voids and the rotor of FIGS. 1-3 at 350 Arms armature current.

FIG. 11 provides a similar comparison at 350 $A_{rms}$, at this load, the calculated torque ripple for the machine without voids (blue line) is 7.73% and the calculated torque ripple for the machine with voids (red line) is 4.15%.

Figure 12:
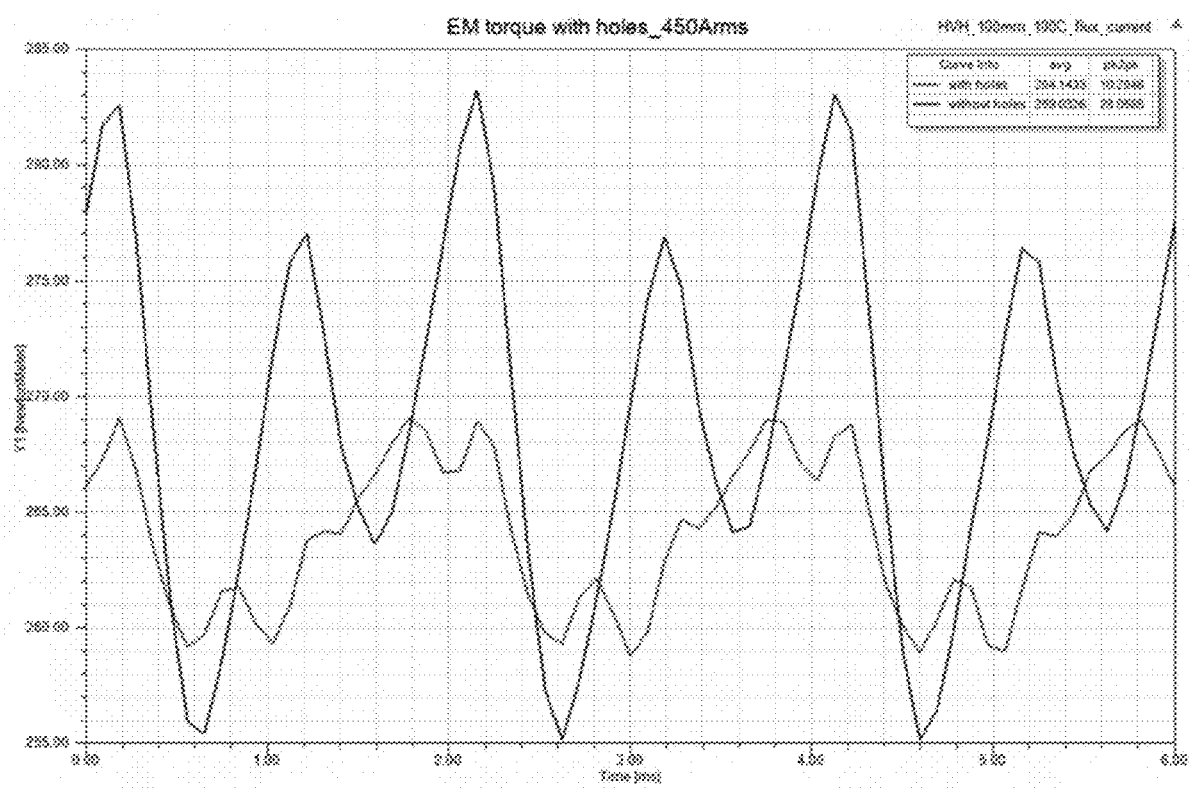
FIG. 12 is a chart comparing the torque ripple generated by a rotor without voids and the rotor of FIGS. 1-3 at 450 Arms armature current (full load).

FIG. 12 provides a similar comparison at 450 $A_{rms}$, (full load), at this load, the calculated torque ripple for the machine without voids (blue line) is 10.43% and the calculated torque ripple for the machine with voids (red line) is 3.89%.

As demonstrated by the data presented in the charts of FIGS. 8-12, voids 86, 88, 90 provide an increasing improvement in the performance of the electric machine as the load increases.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
a stator operably coupled with a rotor, the rotor being rotatable about a rotational axis; wherein the rotor includes a rotor core formed out of magnetically permeable material, the rotor defining a plurality of poles, wherein each pole includes a plurality of discrete axially extending magnet slots formed in the rotor core with at least one permanent magnet being positioned in each of the separate magnet slots; and
wherein each of the plurality of poles defines a respective radial centerline and includes a plurality of voids defined by the rotor core; and
for each of the plurality of poles:
the plurality of magnet slots includes at least one central magnet slot and first and second outer magnet slots, the first and second outer magnet slots being positioned on opposite circumferential sides of the radial centerline of the pole and being at least partially positioned radially outwardly of a radially outermost edge of the at least one central magnet slot;
wherein each of the plurality of voids is spaced from each of the magnet slots and positioned circumferentially between the first and second outer magnet slots and radially outwardly of the at least one central magnet slot;
wherein each of the plurality of voids has a radial length and a circumferential width wherein the radial length is greater than the circumferential width;
wherein each of the plurality of voids is spaced from an outer radial perimeter of the rotor core by a first radial distance that is greater than a minimum radial distance separating the first and second outer magnet slots from the outer radial perimeter of the rotor core; and
wherein the first radial distance is no greater than a minimum radial distance separating the permanent magnets disposed in the first and second outer magnet slots from the outer radial perimeter of the rotor core and wherein each of the plurality of voids is radially spaced from a radially outer edge of the at least one central slot by a second radial distance that is at least as great as the first radial distance.

2. The electric machine of claim 1 wherein the at least one central magnet slot comprises two discrete central magnet slots, each of the central magnet slots having at least one permanent magnet disposed therein.

3. The electric machine of claim 1 wherein each of the plurality of voids has a common circumferential width.

4. The electric machine of claim 1 wherein the first radial distance defined by each of the plurality of voids is at least twice the circumferential width of the void.

5. The electric machine of claim 1 wherein each of the plurality of voids is separated from a circumferentially adjacent void or magnet slot by a circumferential distance that is at least three times greater than the circumferential width of the void.

6. The electric machine of claim 1 wherein each of the plurality of voids is separated from a circumferentially adjacent void or magnet slot by a circumferential distance that is at least six times greater than the circumferential width of the void.

7. The electric machine of claim 1 wherein each of the voids includes opposing, radially extending edges wherein the radially extending edges of each void are linear and parallel.

8. The electric machine of claim 7 wherein the radially extending edges of each void are parallel with a radial line bisecting the void.

9. The electric machine of claim 1 wherein each of the voids has the same circumferential width.

10. The electric machine of claim 9 wherein the voids are positioned symmetrically about the centerline of the pole and wherein the radial length of the voids varies with voids having shorter radial lengths being positioned circumferentially outwardly of voids having longer radial lengths.

11. The electric machine of claim 10 wherein at least two voids on each circumferential side of the centerline of the pole have a common radial length and wherein at least one void having a radial length shorter than the common radial length is disposed on each circumferential side of the centerline of the pole and positioned circumferentially outwardly of the at least two voids having a common radial length.

12. An electric machine comprising:
a stator operably coupled with a rotor, the rotor being rotatable about a rotational axis; wherein the rotor includes a rotor core formed out of magnetically permeable material, the rotor defining a plurality of poles, wherein each pole includes a plurality of discrete axially extending magnet slots formed in the rotor core with at least one permanent magnet being positioned in each of the separate magnet slots; and
wherein each of the plurality of poles defines a respective radial centerline and includes a plurality of voids defined by the rotor core and wherein each of the plurality of poles has a configuration that is symmetrical about the respective radial centerline; and
for each of the plurality of poles:
the plurality of magnet slots includes at least one central magnet slot and first and second outer magnet slots, the first and second outer magnet slots being positioned on opposite circumferential sides of the radial centerline of the pole and being at least partially positioned radially outwardly of a radially outermost edge of the at least one central magnet slot; and
each of the plurality of voids axially extends through the rotor core and is spaced from each of the magnet slots and positioned circumferentially between the first and second outer magnet slots and radially outwardly of the at least one central magnet slot, each of the plurality of voids having a radial length and a circumferential width wherein the radial length is greater than the circumferential width; and wherein each of the plurality of voids is spaced from an outer radial perimeter of the rotor core by a first radial distance that is at least twice the circumferential width of the void and is spaced from a radially outer edge of the at least one central magnet slot by a second radial distance that is at least as great as the first radial distance; and wherein each of the plurality of voids is separated from a circumferentially adjacent void or magnet slot by a circumferential distance that is at least as great as the circumferential width of the void.

13. The electric machine of claim 12 wherein each of the plurality of voids has a common circumferential width.

14. The electric machine of claim 13 wherein the first radial distance is greater than a minimum radial distance separating the first and second outer magnet slots from the outer radial perimeter of the rotor core and wherein the first radial distance is no greater than a minimum radial distance separating the permanent magnets disposed in the first and second outer magnet slots from the outer radial perimeter of the rotor core.

15. The electric machine of claim 14 wherein each of the plurality of voids is separated from a circumferentially adjacent void or magnet slot by a circumferential distance that is at least three times greater than the circumferential width of the void.

16. The electric machine of claim 15 wherein the radial length of the voids varies with voids having shorter radial lengths being positioned circumferentially outwardly of voids having longer radial lengths.

17. The electric machine of claim 16 wherein at least two voids on each circumferential side of the centerline of the pole have a common radial length and wherein at least one void having a radial length shorter than the common radial length is disposed on each circumferential side of the centerline of the pole and positioned circumferentially outwardly of the at least two voids having a common radial length.

* * * * *